Jan. 3, 1939.  A. PAVENICK  2,142,205
HAND MIRROR
Filed June 4, 1936
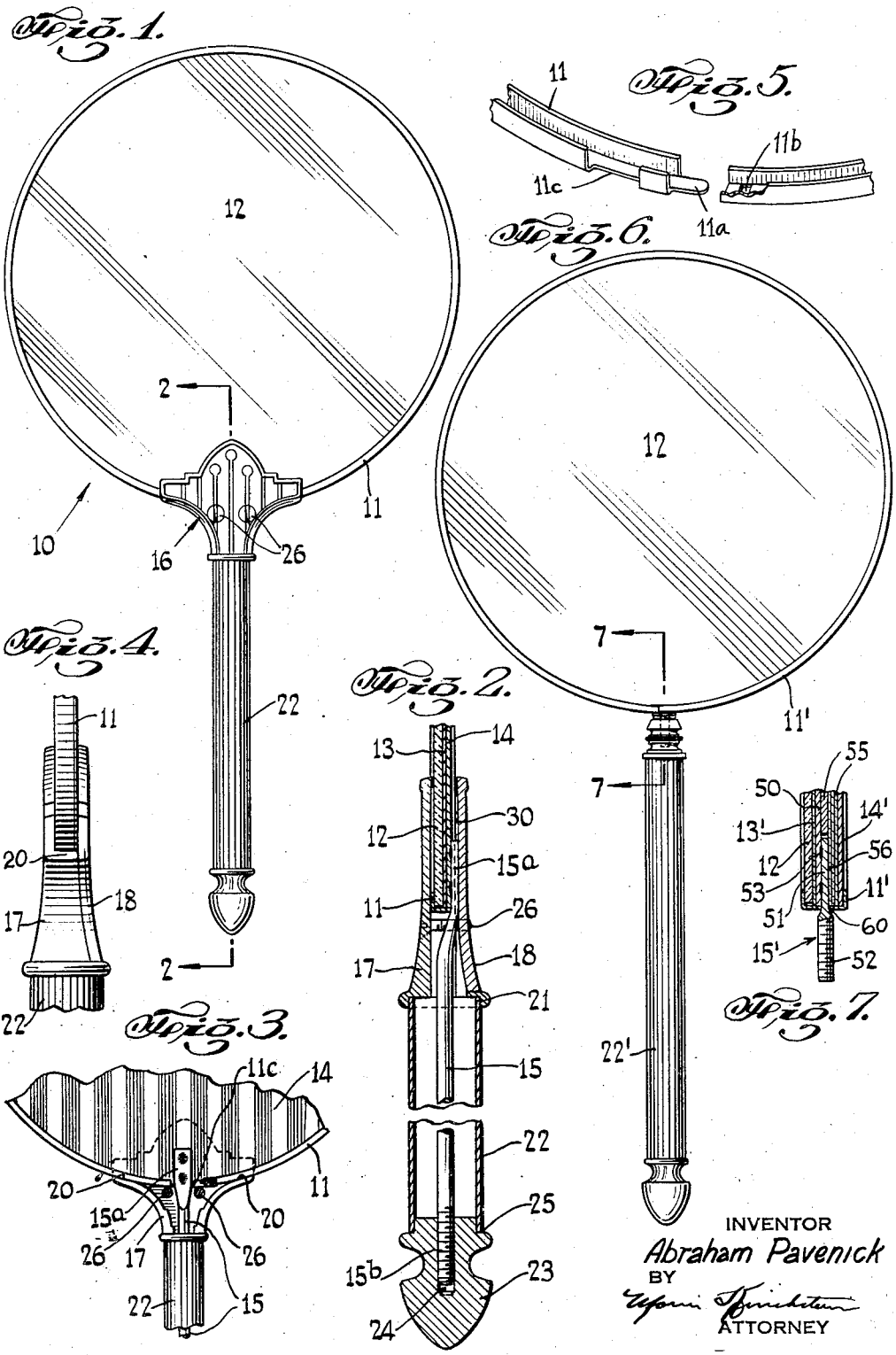
INVENTOR
Abraham Pavenick
BY
ATTORNEY Patented Jan. 3, 1939

2,142,205

UNITED STATES PATENT OFFICE 2,142,205

HAND MIRROR

Abraham Pavenick, New York, N. Y.

Application June 4, 1936, Serial No. 83,500

10 Claims. (Cl. 88—102)

My invention relates to hand mirrors. More particularly, it relates to hand mirrors of the type having handles detachably connected thereto.

One of the objects of my invention is to provide a hand mirror of the character described having a highly improved frame construction, whereby a handle may be detachably secured thereto; which shall comprise relatively few and simple parts; which shall be rugged in construction; neat in appearance; relatively inexpensive to manufacture; easy to assemble and yet highly efficient.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawing, in which is shown one of the various possible embodiments of this invention, Fig. 1 is an assembly view showing a hand mirror embodying my invention;

Fig. 2 is an enlarged section taken substantially on the line 2—2 of Fig. 1;

Fig. 3 is a fragmentary view of a portion of the mirror illustrated in Fig. 1 but disclosing the back thereof and having a part removed, disclosing a detail of the construction thereof;

Fig. 4 is a side elevational view of a portion of the construction illustrated in Fig. 2;

Fig. 5 is a fragmentary detail in perspective of a portion of the frame;

Fig. 6 is an assembly view showing a hand mirror embodying a modified form of my invention; and Fig. 7 is a section taken substantially on the line 7—7 of Fig. 6.

Referring now in detail to the drawing, and particularly to Figs. 1 to 5, there is disclosed a hand mirror 10 comprising a channelled frame 11 of substantially U-shaped cross section, which is bent in circular shape. Into the frame 11 there is positioned a mirror 12, having the mirrored surface thereof exposed and contacting one side of the frame. Adjacent the back of the mirror 12 and contacting therewith is a suitably shaped protective layer 13, which may be of any desirable material, such as cardboard or paper. Contacting the said layer 13, is a backing member 14, which may be of any desirable material for mirror backs, such as a thin metal plate ornamented in any suitable manner well known in the art.

When the members 12, 13 and 14 have been properly disposed in the frame 11, as above described, they are held in assembled relationship by fastening the two ends of the said frame together by any suitable fastening means, such as a tongue 11a and a slot 11b shown in Fig. 5 of the drawing. For removably attaching a handle to the mirror 10 I provide a rod 15 having one end 15a thereof flattened, while the other end 15b is preferably screw threaded as shown in Fig. 2 of the drawing. The flattened end 15a of the rod 15 is attached to the outer surface of the backing member 14 by any suitable attaching means, such as for example, spot welding as shown, or by riveting or by any other well-known method. The frame 11 may be provided with a notch 11c adapted to straddle the end 15a of the rod 15.

I provide a two-part clamping member 16 comprising the parts 17 and 18, the part 17 being adapted to engage the front while the part 18 is designed to contact the back of the said mirror 10. The clamp 16 is provided with an arcuous shoulder 20 which is adapted to abut the outer rim of the frame 11. The clamp 16 is further provided with an annular inner shoulder 21 (see Fig. 2) adapted to receive and hold therein a hollow tubular handle member 22. The member 22 is disposed concentrically with respect to the rod 15 and is held in proper position by means of a knob 23 which is provided with a centrally disposed threaded aperture and screwed on to the end 15b of the said rod 15. The knob is provided with an annular shoulder 25 adapted to abut the tube 22. The parts 17 and 18 of the clamp 16 may be held in assembled relationship by any suitable fastening means, such as for example, flat headed machine screws 26 disposed so as to clear the frame 11, as shown in Fig. 2, so that any pressure exerted on the clamp 16 by the screws 26 will be taken up by the frame 11 and thus protect the mirror against cracking. If desired, the part 18 of the clamp 16 may be provided with a clearance groove 30 adapted to receive therein the end 15a of the rod 15.

It is thus seen from the above described construction that when the knob 23 is rotated in one direction, the tube 22 will press against the shoulder 21 of the clamp 16, which will press the shoulders 20 against the frame 11 and thus hold the handle and mirror in rigid relationship. The clamp 16 which is preferably of pleasing contour and appearance, serves also to hide from view the connection between the rod 15 and the plate 14.

In Figs. 6 and 7 I have disclosed a modified form of hand mirror and handle construction in accordance with my invention. In this form of hand mirror I provide a channelled frame 11' of substantially U-shaped cross section, which is bent into circular shape, in a manner similar to the frame 11. However, the frame 11' is of greater width than the frame 11 for reasons which will soon become apparent. Into the frame 11' I position the following members to form a laminated assembly: A mirror 12 having the mirrored surface thereof exposed and contacting one side of the frame. Adjacent the back of the mirror 12 and contacting therewith is a suitably shaped protective layer 13' which may be of any desirable material, such as paper or cardboard. Next to the layer 13' I place a plate 50, to the back of which I attach a short rod 15' having one end 51 thereof flattened and the other end 52 screw threaded. The flattened end 51 I attach to the plate 50 by any suitable attaching means, such as spot welding 53, as shown, or by riveting. Contacting the plate 50 is a plurality of layers 55 of cardboard material or any similar material may be employed. If desired, the layers 55 may be formed into one layer of material. The layers 55 are provided with a notched portion 56 designed to accommodate and to clear the end 51 of the rod 15'. Finally there is positioned in the frame 11' a mirror back member 14' similar to the member 14 which may be of any desirable design customary in the art. The laminated assembly of layers are designed to fit snugly across the width of the frame 11', the ends of the said frame being adapted to be fastened together by any suitable fastening means, such as a tongue and slot arrangement, similar to the tongue and slot arrangement for fastening together the frame 11, as shown in Fig. 5. An aperture 60 is provided in the frame 11' to permit the rod 15' to pass therethrough. Any suitable handle such as a fluted tubular handle 22' having a screw threaded aperture at one end thereof may be screwed to the rod 15' to be rigidly attached to the mirror. In the form of hand mirror construction just described the clamping member 16 is not necessary inasmuch as the joint between the rod 15' and the plate 50 is not exposed as in the form illustrated in Figs. 1 to 5 of the drawing. It is also seen that the construction as illustrated in Figs. 1 to 5 permits of a thinner hand mirror construction than the form illustrated in Figs. 6 and 7.

It will thus be seen that there is provided a device in which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawing is to be interpreted as illustrative and not in a limiting sense.

Having thus described my invention, I claim as new and desire to secure by Letters Patent:

1. A hand mirror construction of the character described, comprising a mirror member, a backing member, a frame for housing said members, a rigid rod member fixed to the outer surface of said backing member and projecting through and beyond said frame, the axis of said rod being in a plane parallel to said backing member and in substantial alignment therewith, and a bifurcated clamping member adapted to engage said frame and to conceal said rod, said clamping member being provided with an aperture through which said rod is adapted to project.

2. A hand mirror construction of the character described, comprising a mirror member, a backing member, a frame having side edges and a bottom edge, for housing said members, a rigid rod member fixed to the outer surface of said backing member and projecting beyond said frame, and a bifurcated clamping member adapted to engage opposite side edges of the said frame and to conceal said rod, said clamping member being provided with an aperture through which the said rod is adapted to project.

3. A hand mirror construction of the character described, comprising a mirror member, a backing member, a frame having side edges and a bottom edge, for housing said members, a rigid rod member fixed to the outer surface of said backing member and projecting beyond said frame, a bifurcated clamping member adapted to engage opposite side edges of the said frame and to conceal said rod, said clamping member being provided with an aperture through which the said rod is adapted to project, and a handle attached to said projecting portion of the said rod.

4. A hand mirror construction of the character described, comprising a mirror member, a backing member, a frame having side edges and a bottom edge, for housing said members, a rigid rod member fixed to the outer surface of said backing member and projecting beyond said frame, a bifurcated clamping member adapted to engage opposite side edges of the said frame and to conceal said rod, said clamping member being provided with an aperture through which the said rod is adapted to project, and a handle attached to said projecting portion of the said rod, said clamping member having a shoulder adapted to abut the bottom edge of said frame.

5. A hand mirror construction of the character described, comprising a mirror member, a backing member, a frame having side edges and a bottom edge, for housing said members, a rigid rod member fixed to the outer surface of said backing member and projecting beyond said frame, a two-part clamping member adapted to engage opposite side edges of the said frame and to conceal said rod, said clamping member being provided with an aperture through which the said rod is adapted to project, and a handle attached to said projecting portion of the said rod, said clamping member having a shoulder adapted to abut the bottom edge of said frame.

6. A hand mirror construction of the character described, comprising a mirror member, a backing member, a frame having side edges and a bottom edge, for housing said members, a rigid rod member fixed to the outer surface of said backing member and projecting beyond said frame, a two-part clamping member adapted to engage opposite side edges of the said frame and to conceal said rod, said clamping member being provided with an aperture through which the said rod is adapted to project, a handle attached to said projecting portion of the said rod, said clamping member having a shoulder adapted to abut the bottom edge of said frame, and means for holding the said two-part clamp in assembled relationship.

7. A hand mirror construction of the character described, comprising a mirror member, a backing member, a frame having side edges and a bottom edge, for housing said members, a rigid rod member fixed to the outer surface of said backing member and projecting beyond said frame, a two-part clamping member adapted to engage opposite side edges of the said frame and to conceal said rod, said clamping member being provided with an aperture through which the said rod is adapted to project, a handle attached to said projecting portion of the said rod, said clamping member having a shoulder adapted to abut the bottom edge of said frame, and means for holding the said two-part clamp in assembled relationship, said means comprising a screw disposed so as to clear said frame.

8. A hand mirror construction of the character described, comprising a mirror member, a backing member, a frame having side edges and a bottom edge, for housing said members, a rigid rod member fixed to the outer surface of said backing member and projecting beyond said frame, a two-part clamping member adapted to engage opposite side edges of the said frame and to conceal said rod, said clamping member being provided with an aperture through which the said rod is adapted to project, and a handle attached to said projecting portion of the said rod, said clamping member having a shoulder adapted to abut the bottom edge of said frame, the inner surface of one of said clamp parts being provided with a groove to accommodate the flattened portion of the said rod.

9. A hand mirror construction of the character described, comprising a mirror member, a backing member, a frame having side edges and a bottom edge, for housing said members, a rigid rod member fixed to the outer surface of said backing member and projecting beyond said frame, a bifurcated clamping member adapted to engage opposite side edges of the said frame and to conceal said rod, said clamping member being provided with an aperture through which the said rod is adapted to project, and a handle attached to said projecting portion of the said rod, said handle comprising a hollow tube, one end of which is adapted to abut the said clamp.

10. A hand mirror construction of the character described, comprising a mirror member, a backing member, a frame having side edges and a bottom edge, for housing said members, a rigid rod member fixed to the outer surface of said backing member and projecting beyond said frame, a bifurcated clamping member adapted to engage opposite side edges of the said frame and to conceal said rod, said clamping member being provided with an aperture through which the said rod is adapted to project, and a handle attached to said projecting portion of the said rod, said handle comprising a hollow tube concentrically disposed with respect to said rod and having one end thereof adapted to abut the said clamp.

ABRAHAM PAVENICK.